(12) United States Patent
Toraya (10) Patent No.: US 12,031,927 B2
(45) Date of Patent: Jul. 9, 2024

(54) METHOD AND DEVICE FOR ANALYZING DIFFRACTION PATTERN OF MIXTURE, AND INFORMATION STORAGE MEDIUM

(71) Applicant: Rigaku Corporation, Akishima (JP)

(72) Inventor: Hideo Toraya, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 196 days.

(21) Appl. No.: 17/546,656

(22) Filed: Dec. 9, 2021

(65) Prior Publication Data

US 2022/0187225 A1 Jun. 16, 2022

(30) Foreign Application Priority Data

Dec. 11, 2020 (JP) ................. 2020-206310

(51) Int. Cl.
*G01N 23/2055* (2018.01)

(52) U.S. Cl.
CPC ... *G01N 23/2055* (2013.01); *G01N 2223/605* (2013.01)

(58) Field of Classification Search
CPC ... G01N 2223/0566; G01N 2223/1016; G01N 2223/306; G01N 2223/605; G01N 2223/62; G01N 2223/66; G01N 23/2055
See application file for complete search history.

(56) References Cited

U.S. PATENT DOCUMENTS

| | | | | |
|---|---|---|---|---|
| 9,494,536 B1 * | 11/2016 | Barney | ............... | G01N 23/2206 |
| 2003/0198997 A1 * | 10/2003 | Von Dreele | .......... | G01N 23/207 435/7.1 |
| 2004/0103130 A1 * | 5/2004 | Ivanisevic | .......... | G01N 23/2055 708/200 |
| 2008/0121802 A1 * | 5/2008 | Jiang | ................ | G01N 23/20058 250/311 |
| 2014/0278147 A1 * | 9/2014 | Sasaki | .................. | G01N 23/207 702/28 |
| 2015/0276629 A1 * | 10/2015 | Ruf | .................. | G01N 23/20075 378/73 |

(Continued)

FOREIGN PATENT DOCUMENTS

| | | |
|---|---|---|
| JP | 2019184254 A | 10/2019 |
| WO | 2017149913 A1 | 9/2017 |
| WO | 2019031019 A1 | 2/2019 |

*Primary Examiner* — Dani Fox
*Assistant Examiner* — Soorena Kefayati
(74) *Attorney, Agent, or Firm* — CANTOR COLBURN LLP (57) ABSTRACT

Provided is a method of analyzing a diffraction pattern of a mixture, the method including: a first step of fitting, through use of a fitting pattern including a term obtained by multiplying a known target pattern indicating a target component by a first intensity ratio, and a term obtained by multiplying an unknown pattern indicating a residual group consisting of one or more residual components by a second intensity ratio, and having the first intensity ratio, the second intensity ratio, and the unknown pattern as fitting parameters, the fitting pattern to the observed pattern by changing the first and the second intensity ratio in a state where the unknown pattern is set to an initial pattern; and a second step of fitting the fitting pattern to the observed pattern by changing the unknown pattern while restricting the changes of the first and the second intensity ratio.

8 Claims, 6 Drawing Sheets

(56) References Cited

U.S. PATENT DOCUMENTS

| | | | |
|---|---|---|---|
| 2015/0355112 A1* | 12/2015 | Sato | G01N 23/20075 |
| | | | 378/62 |
| 2016/0356729 A1* | 12/2016 | Bauer | H01J 37/20 |
| 2017/0102623 A1* | 4/2017 | Pisarenco | G01N 23/201 |
| 2017/0343492 A1* | 11/2017 | Ikeda | G01N 23/207 |
| 2018/0364183 A1* | 12/2018 | Toraya | G01N 23/2076 |
| 2019/0018824 A1* | 1/2019 | Zarkadas | G01N 23/223 |
| 2019/0041342 A1* | 2/2019 | Ohbuchi | G01N 23/223 |
| 2020/0173938 A1 | 6/2020 | Toraya et al. | |
| 2021/0018452 A1 | 1/2021 | Toraya et al. | |
| 2021/0080407 A1* | 3/2021 | Tsubota | G01N 23/207 |

* cited by examiner

METHOD AND DEVICE FOR ANALYZING DIFFRACTION PATTERN OF MIXTURE, AND INFORMATION STORAGE MEDIUM

CROSS-REFERENCE TO RELATED APPLICATION

The present application claims priority under 35 U.S.C. § 119 to Japanese Application No. 2020-206310 filed on Dec. 11, 2020, the entire contents of which is incorporated herein by reference.

BACKGROUND OF THE INVENTION

1. Field of the Invention

The present invention relates to a method and a device for analyzing a diffraction pattern of a mixture, and an information storage medium, and to technology for calculating intensity ratios of one or a plurality of known diffraction patterns included in an observed pattern of X-ray diffraction.

2. Description of the Related Art

Quantitative phase analysis of a mixture can be performed through use of an X-ray diffraction method. An actually observed diffraction pattern of the mixture includes known diffraction patterns derived from respective components in a superimposed manner. When the quantitative phase analysis is performed, intensity ratios of the known diffraction patterns derived from the respective components in the actually observed diffraction pattern are calculated. Once the intensity ratios are found, for example, a direct derivation method, which is a method of quantitative phase analysis developed by the inventor of the present invention, can be used to calculate weight fractions of the respective components. For example, in each of JP 2017/149913 A1, WO 2019/031019 A1, and Japanese Patent Application Laid-open No. 2019-184254, a method of calculating the weight fractions of the respective components through use of the direct derivation method is disclosed.

With the method of the related art described above, in decomposing the observed diffraction pattern into the plurality of known diffraction patterns, it is required to prepare the known diffraction patterns for all possible components. However, it is often difficult to prepare the known diffraction patterns for all components in reality. Meanwhile, in quantitative phase analysis of a mixture through use of the X-ray diffraction method, there are many application scenarios in which only a weight fraction of a particular known substance, for example, an amount of a known substance mixed with an unknown substance, is required.

SUMMARY OF THE INVENTION

The present invention has been made in view of the above-mentioned problem, and therefore has an object to provide a method and a device for analyzing a diffraction pattern of a mixture, and a computer-readable information storage medium, with which, even in a case in which diffraction patterns are known for only some components, intensity ratios of the diffraction patterns of those components can be calculated.

In order to solve the above-mentioned problem, according to at least one embodiment of the present invention, there is provided a method of analyzing a diffraction pattern of a mixture, the method including: an observed pattern acquisition step of acquiring an observed pattern of X-ray diffraction; a fitting pattern acquisition step of acquiring a fitting pattern including a term obtained by multiplying a known target pattern indicating a target component by a first intensity ratio, and a term obtained by multiplying an unknown pattern indicating a residual group consisting of one or more residual components by a second intensity ratio, and having the first intensity ratio, the second intensity ratio, and the unknown pattern as fitting parameters; a first fitting step of fitting the fitting pattern to the observed pattern by changing the first intensity ratio and the second intensity ratio under a state in which the unknown pattern is set to an initial pattern; and a second fitting step of fitting, after the first fitting step, the fitting pattern to the observed pattern by changing the unknown pattern while restricting the changes of the first intensity ratio and the second intensity ratio.

The first fitting step and the second fitting step may be repeated a plurality of times.

Further, the fitting pattern may further include a term of a temporary pattern serving as a fitting parameter. The first fitting step may include fitting the fitting pattern to the observed pattern by changing the temporary pattern as well as the first intensity ratio and the second intensity ratio. The second fitting step may include changing the unknown pattern so that at least a part of the term of the temporary pattern is absorbed by the term related to the residual group.

Further, quantitative phase analysis of the target component may be performed based on the first intensity ratio and the second intensity ratio.

Further, according to at least one embodiment of the present invention, there is provided a device for analyzing a diffraction pattern, the device including: an observed pattern storage configured to store data of an observed pattern acquisition step of acquiring an observed pattern of X-ray diffraction; a fitting pattern storage configured to store data indicating a fitting pattern acquisition step of acquiring a fitting pattern including a term obtained by multiplying a known target pattern indicating a target component by a first intensity ratio, and a term obtained by multiplying an unknown pattern indicating a residual group consisting of one or more residual components by a second intensity ratio, and having the first intensity ratio, the second intensity ratio, and the unknown pattern as fitting parameters; a first fitting module configured to fit the fitting pattern to the observed pattern by changing the first intensity ratio and the second intensity ratio in a state where the unknown pattern is set to an initial pattern; and a second fitting module configured to fit, after the fitting by the first fitting module, the fitting pattern to the observed pattern by changing the unknown pattern while restricting the changes of the first intensity ratio and the second intensity ratio.

Further, according to at least one embodiment of the present invention, there is provided an information storage medium having stored therein a program for causing a computer to function as: an observed pattern storage configured to store data of an observed pattern of X-ray diffraction; a fitting pattern storage configured to store data indicating a fitting pattern including a term obtained by multiplying a known target pattern indicating a target component by a first intensity ratio, and a term obtained by multiplying an unknown pattern indicating a residual group consisting of one or more residual components by a second intensity ratio, and having the first intensity ratio, the second intensity ratio, and the unknown pattern as fitting parameters; a first fitting module configured to fit the fitting pattern to the observed pattern by changing the first intensity ratio and the second intensity ratio in a state where the unknown pattern is set to an initial pattern; and a second fitting module configured to fit, after the fitting by the first fitting module, the fitting pattern to the observed pattern by changing the unknown pattern while restricting the changes of the first intensity ratio and the second intensity ratio.

DETAILED DESCRIPTION OF THE INVENTION

Now, at least one embodiment of the present invention will be described in detail with reference to the drawings.
(System Configuration)

Figure 1:
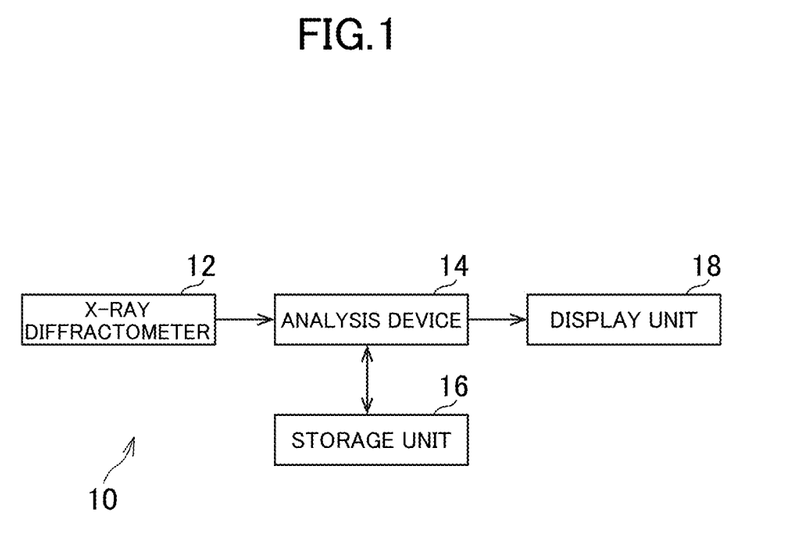
FIG. 1 is a diagram illustrating a configuration of an analysis system in at least one embodiment of the present invention.

FIG. 1 is a diagram illustrating a configuration of an analysis system in one embodiment of the present invention. As illustrated in FIG. 1, an analysis system 10 in the at least one embodiment includes an X-ray diffractometer 12, an analysis device 14, a storage unit 16, and a display unit 18.

The X-ray diffractometer 12 performs powder X-ray diffraction measurement. Specifically, the X-ray diffractometer 12 allows an X-ray having a known wavelength to enter a sample material, and measures an intensity of a diffraction X-ray. Data of an X-ray intensity for each value of a diffraction angle 2θ is output as an observed pattern from the X-ray diffractometer 12 to the analysis device 14. The observed pattern output to the analysis device 14 may have been subjected to correction with a Lorentz-polarization factor (Lp correction).

In this example, the sample material to be analyzed by the system is a mixture, and the mixture contains one or more target components (target substances) and a residual group. The target components are components constituting subjects of quantitative measurement. The residual group consists of one or more residual components (substances other than the target components). An example of the residual group is a group in which, although it is known at what mixture ratios components of what chemical compositions exist, diffraction patterns of the components are unknown. Another example is a group in which, although a chemical composition of the entire mixture is known by fluorescent analysis, for example, chemical compositions or mixture ratios are unknown for the residual group.

The analysis device 14 is formed of a known computer system, for example, and includes an arithmetic device and a memory. The storage unit 16 formed of a computer-readable information storage medium, for example, a solid state disk (SSD) or a hard disk drive (HDD), is connected to the analysis device 14. The storage unit 16 has stored therein an analysis program in at least one embodiment of the present invention, and this analysis program is executed by the analysis device 14 to implement an analysis method in at least one embodiment of the present invention.

In the storage unit 16, X-ray diffraction patterns of the respective target components alone are further stored in advance as target patterns. Those target patterns may be X-ray diffraction patterns obtained through measurement by the X-ray diffractometer 12 using the target components alone as samples.

In the storage unit 16, an initial pattern of an unknown pattern, which is an X-ray diffraction pattern of the residual group, is further stored. In the at least one embodiment, the unknown pattern is brought closer to a true pattern while this initial pattern is changed. The initial pattern may be an X-ray diffraction pattern of a main component of components contained in the residual group. Alternatively, the initial pattern may be a linear combination of respective X-ray diffraction patterns of a plurality of components contained in the residual group. However, the initial pattern is not limited thereto. As described later, the initial pattern is changed to an appropriate pattern in the course of calculation, and hence an X-ray diffraction pattern of a substance that is not actually contained in the residual group may be used as the initial pattern.

In the storage unit 16, chemical composition information (types and atomic weights of contained atoms) of the target components is further stored. In the storage unit 16, chemical composition information of the entire mixture, which is the sample, may be stored.

The display unit 18 is a display device for displaying results of analysis by the analysis device 14. For example, the display unit 18 displays intensity ratios of the target patterns and the unknown pattern, weight fractions of the respective target components, and a weight fraction of the entire residual group.
(Theoretical Background)

Now, description will be given of a theoretical background of X-ray diffraction pattern analysis performed by the analysis device 14. The analysis in the analysis device 14 is to analyze the observed pattern including the unknown pattern through application of a direct derivation method.

According to the direct derivation method, when a mixture being a sample has K components, a weight fraction $w_k$ of the k-th component is expressed by the following equation (1).

$$w_k = \frac{a_k S_k}{a_1 S_1 + a_2 S_2 + \ldots + a_K S_K} \quad (1)$$

$S_k$ represents a total sum of intensities of the k-th component that have been subjected to the Lp correction, and corresponds to an observed intensity. Further, $a_k$ is a parameter calculated based on chemical composition information of the k-th component, which is stored in the storage unit 16, and corresponds to a reciprocal of a scattering intensity per unit weight. The parameter $a_k$ is expressed by the following equation (2).

$$a_k = M_k (\Sigma n_{ki'}^2)^{-1} \quad (2)$$

In the equation (2), $M_k$ is a chemical formula weight of the k-th component. Further, $n_{ki'}$ is the number of electrons contained in the i-th atom forming the k-th component. Σ means a sum of all atoms in the chemical formula of the k-th component.

Next, when the number of target components is KT (k=1 to KT), and the number of residual components is K−KT (k=KT+1 to K), the weight fraction $w_k$ (k=1 to KT) of the k-th component, which is one of the target components, is expressed by the following equation (3).

$$w_k = \frac{a_k S_k}{(a_1 S_1 + a_2 S_2 + \ldots + a_{KT} S_{KT} +) + a_{R\_av} S_R} \quad (3)$$

In the equation (3), $S_R$ is a total sum of observed intensities of the residual group that have been subjected to the Lp correction. In other words, $S_R$ means the following equation (4).

$$S_R = S_{KT+1} + S_{KT+2} + \ldots + S_K \quad (4)$$

It should be noted, however, that it is one of features of the at least one embodiment that, instead of calculating total sums $S_{KT+1}$, $S_{KT+2}$, ..., $S_K$ of observed intensities of the residual components, respectively, $S_R$ of the entire residual group is calculated.

Further, $a_{R\_av}$ is calculated based on chemical composition information of the entire residual group. A method of calculating $a_{R\_av}$ will be described later.

A weight fraction $w_R$ of the entire residual group is expressed by the following equation (5).

$$w_R = 1 - \sum_{k=1}^{KT} w_k \quad (5)$$

The parameter $a_k$ (k=1 to KT) is known for the target components, and $S_k$ (k=1 to KT) can also be calculated based on intensity ratios of the target patterns included in the observed pattern. As described later, a plurality of calculation methods exist also for $a_{R\_av}$. Further, as described below, the unknown pattern related to the residual group can also be calculated, and $S_R$ can also be calculated based on an intensity ratio of the unknown pattern. Thus, the weight fraction $w_k$ for each of the target components, and the weight fraction $w_R$ for the residual group can be determined based on the equations (3) and (5).

(Fitting Pattern)

A fitting pattern is expressed by the following equation (6).

$$Y_i^{calc} = \sum_{k=1}^{KT} Sc_k^T Y_{ki}^T + Sc^R Sc_i Y_i^R + Y_i^{TMP} \quad (6)$$

In the equation (6), "i" represents each step of diffraction angle (i=1 to N). $Y_i^{calc}$ represents an intensity at the i-th diffraction angle in the fitting pattern. $Sc_k^T$ represents an intensity ratio of the k-th target component. $Y_{ki}^T$ represents an intensity of the k-th target component at the i-th diffraction angle in a diffraction pattern. $Sc^R$ represents an intensity ratio of the residual group. $Sc_i \times Y_i^R$ represents an unknown pattern, which is a diffraction pattern of the residual group. Of the unknown pattern $Sc_i \times Y_i^R$, $Y_i^R$ represents the initial pattern of the unknown pattern. Specifically, $Y_i^R$ represents an intensity at the i-th diffraction angle in the initial pattern. $Sc_i$ is a correction factor with respect to the intensity at the i-th diffraction angle, by which the initial pattern is multiplied. Every $Sc_i$ is set to 1 at the start of fitting. In order to keep an integrated intensity of the unknown pattern constant, $Sc_i$ has a constraint condition of the following equation (7).

$$N = \sum_{i=1}^{N} Sc_i \quad (7)$$

In other words, the fitting pattern expressed by the equation (6) includes a term obtained by multiplying a known target pattern indicating a target component by an intensity ratio thereof, and a term obtained by multiplying an unknown pattern indicating the residual group by an intensity ratio thereof. Further, the two intensity ratios and the unknown pattern are fitting parameters.

Further, in the equation (6), $Y_i^{TMP}$ represents an intensity at the i-th diffraction angle in a temporary pattern. For $Y_i^{TMP}$, a polynomial having coefficients of the respective terms as fitting parameters can be adopted, for example. $Y_i^{TMP}$ is a provisional term having a role of causing the unknown pattern to converge satisfactorily, and takes zero or a value extremely close to zero at the end of calculation.

(First Fitting Step)

In fitting, in a state where the unknown pattern is first set to $Y_i^R$ being the initial pattern, $Sc_k^T$ being a first intensity ratio, $Sc^R$ being a second intensity ratio, and $Y_i^{TMP}$ are changed to fit the fitting pattern $Y_i^{calc}$ to an observed pattern $Y^{obs}$. Specifically, in order to set the unknown pattern to $Y_i^R$ being the initial pattern, every $Sc_i$ is set to 1. For example, $Sc_k^T$, $Sc^R$, and $Y_i^{TMP}$ are determined so that a difference between $Y_i^{calc}$ expressed in the equation (6) and the observed pattern $Y_i^{obs}$ obtained from the X-ray diffractometer 12 is minimized through use of the least squares method or other methods.

(Second Fitting Step)

Next, in a state where $Sc_k^T$, $Sc^R$, and $Y_i^{TMP}$ are fixed to the values determined in the first fitting step, the unknown pattern $Sc_i \times Y_i^R$ is changed to fit the fitting pattern $Y_i^{calc}$ to the observed pattern $Y_i^{obs}$ In this example, $Sc_i$ is changed to change the unknown pattern $Sc_i \times Y_i^R$.

Specifically, $Sc_i$ is calculated by the following equation (8).

$$Sc_i = \frac{1}{Sc^R Y_i^R}\left(Y_i^{obs} - \sum_{k=1}^{KT} Sc_k^T Y_{ki}^T\right) \quad (8)$$

$Sc_i$ expressed by the equation (8) does not satisfy the requirement of the equation (7). To address this problem, $Sc_i$ is normalized by the following equation (9).

$$Sc_i^{new} = NSc^R\left(S_A - \sum_{k=1}^{KT} Sc_k^T S_{Bk}\right)^{-1} \times Sc_i^{old} \quad (9)$$

In the equation (9), $Sc_i^{new}$ represents the normalized $Sc_i$, and $Sc_i^{old}$ represents the left-hand side of the equation (8). Further, $S_A$ and $S_{Bk}$ are expressed by the following equations (10) and (11), respectively.

$$S_A = \sum_{i=1}^{N} \frac{Y_i^{obs}}{Y_i^R} \quad (10)$$

$$S_{Bk} = \sum_{i=1}^{N} \frac{Y_{ki}^T}{Y_i^R} \quad (11)$$

Then, the first fitting step is executed again using the normalized $Sc_i$. In other words, the first fitting step and the second fitting step are executed a plurality of times repetitively until the error between $Y_i^{obs}$ and $Y_i^{calc}$ converges. The equation (8) expresses a value of $Sc_i$ in a case where it is assumed that a sum of the first term and the second term on the right-hand side of the equation (6) is equal to the observed pattern $Y_i^{obs}$. As a result, the value of the temporary pattern $Y_i^{TMP}$ is absorbed by the second term related to the residual group. Thus, at the end of calculation, the value of the temporary pattern $Y_i^{TMP}$ converges to zero, or a value extremely close to zero.

After $Sc_k^T$ and $Sc^R$ are determined as described above, values of $S_k$ and $S_R$ are calculated using those values. For example, when $Y_{ki}^T$ and $Y_i^R$ are standardized in advance, $S_k$ is equal to $Sc_k^T$, and $S_R$ is equal to $Sc^R$. Then, those values are substituted into the equation (3) to calculate the weight fraction $w_k$. Further, the value of the weight fraction $w_k$ is substituted into the equation (5) to calculate the weight fraction $w_R$ related to the residual group.

(Method (1) of Calculating $a_{R\_av}$)

Now, a method of calculating $a_{R\_av}$ will be described.

In a case where it is known at what mixture ratios components of what chemical compositions exist with respect to the residual group, $a_{R\_av}$ can be determined directly from those items of information.

In other words, when the residual group consists of a substance A ($W_A$ g) and a substance B ($W_B$ g), the residual group gives a scattering intensity expressed by the following equation (12).

$$W_A a_A^{-1} + W_B a_B^{-1} \quad (12)$$

When this scattering intensity is divided by a gross weight of the residual group, a scattering intensity per unit weight, that is, $a_{R\_av}$, is determined. In other words, $a_{R\_av}$ is given by the following equation (13).

$$a_{R\_av}^{-1} = \frac{W_A a_A^{-1} + W_B a_B^{-1}}{W_A + W_B} \quad (13)$$

When the equation (13) is generalized to the residual group consisting of K-T components, $a_{R\_av}$ is expressed using the weight fraction $w_k$ as in the following equation (14).

$$a_{R\_av}^{-1} = \sum_{k'=T+1}^{k} w_{k'} a_{k'}^{-1} \quad (14)$$

In the equation (14), $a_{k'}$ can be calculated based on the chemical composition information using the equation (2). Accordingly, in the case where it is known at what mixture ratios components of what chemical compositions exist in the residual group, $a_{R\_av}$ can be calculated based on the equation (14).

(Method (2) of Calculating $a_{R\_av}$)

Next, description will be given of a case where, although the chemical composition information of the entire mixture (batch composition) is known, the chemical composition information is unknown for the residual group. The chemical composition information of the batch composition can be determined by applying fluorescent analysis to the batch composition, for example. Alternatively, when it can be assumed that there is no volatile component, chemical composition information of a raw material used for synthesis of the mixture can be directly used.

In such case, the chemical composition information of the batch composition is substituted into the equation (2) to calculate $a_k$ for the entire mixture sample. This value is denoted by $a_B$.

As in the equation (14), $a_B$ of the batch composition is expressed by the following equation (15).

$$a_B^{-1} = a_{R\_av}^{-1} w_R + \sum_{k'=1}^{T} w_{k'} a_{k'}^{-1} \quad (15)$$

The equation (15) is modified, and $a_{R\_av}$ for the residual group is expressed by the following equation (16).

$$a_{R\_av}^{-1} = \frac{1}{w_R}\left(a_B^{-1} - \sum_{k'=1}^{T} w_{k'} a_{k'}^{-1}\right) \quad (16)$$

In the equation (16), $a_B$ and $a_{k'}$ are known, but weight fractions $w_R$ and $w_k'$ are unknown. Thus, for example, assuming an initial value of $a_{R\_av}$ to be $a_B$, the weight fractions $w_R$ and $w_k'$ are calculated based on the equations (3) and (5), and are substituted again into the equation (16) to calculate $a_{R\_av}$ again. This calculation can be repeated to calculate $a_{R\_av}$ that is close to a true value.

Figure 2:
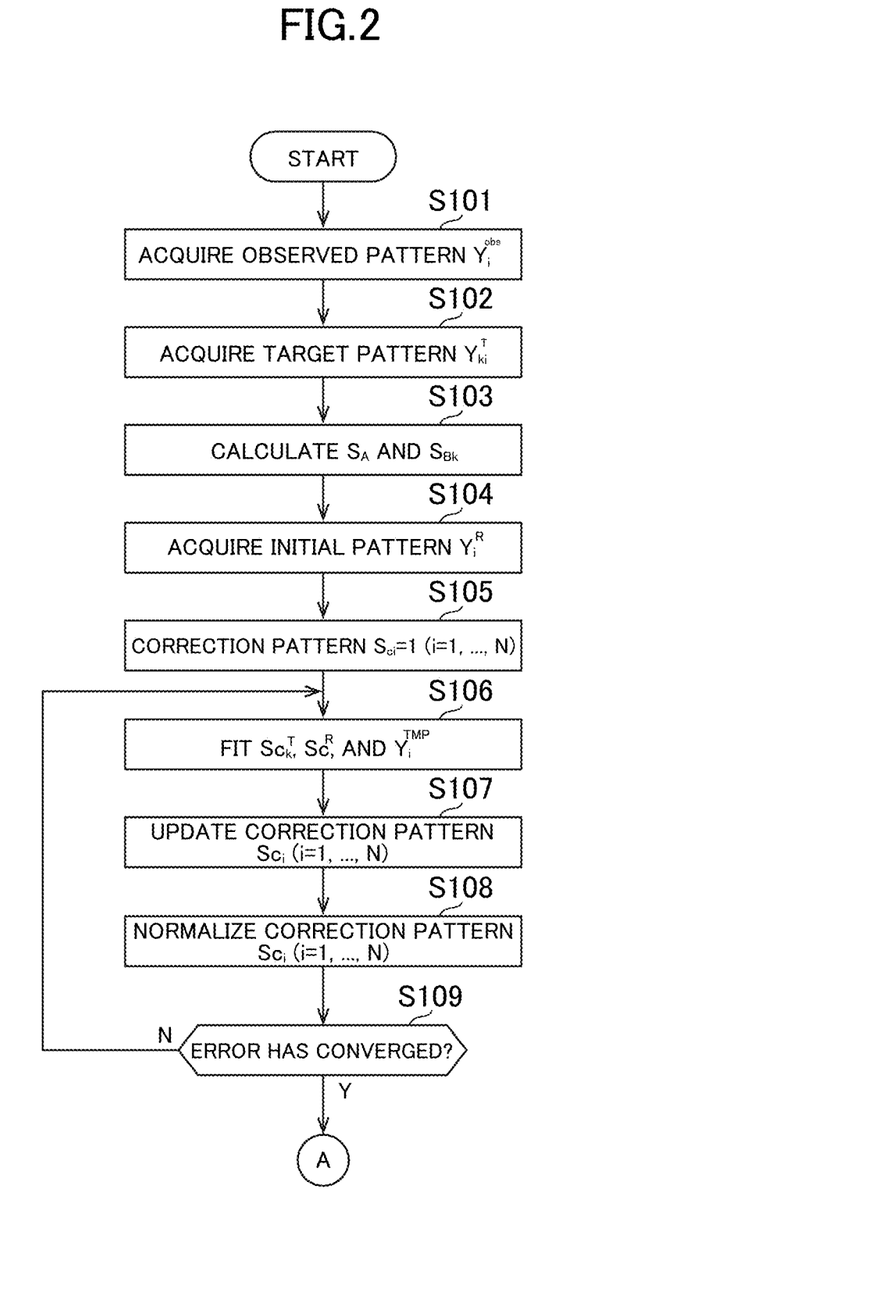
FIG. 2 is a flow chart illustrating operation of an analysis device.
Figure 3:
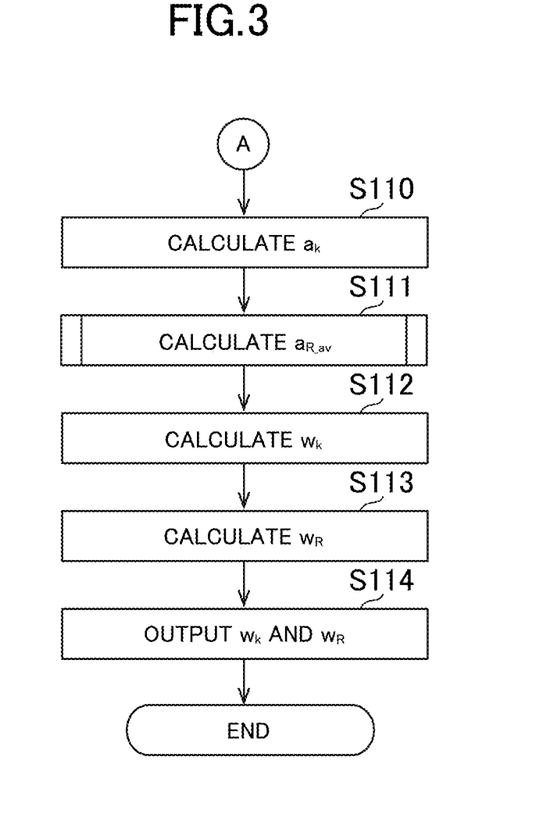
FIG. 3 is a flow chart illustrating the operation of the analysis device.

FIG. 2 and FIG. 3 are flow charts illustrating operation of the analysis device 14.

The analysis device 14 first acquires the observed pattern $Y_i^{obs}$ from the X-ray diffractometer 12 (Step S101). Further, a target pattern $Y_{ki}^T$ is read from the storage unit 16 (Step S102). Thereafter, $S_A$ and $S_{Bk}$ are calculated based on the equations (10) and (11) (Step S103). Further, the initial pattern $Y_i^R$ is read from the storage unit 16 (Step S104).

Thereafter, every value of a correction pattern $S_{ci}$ is initialized to 1 (Step S105), and the first fitting step described above is executed (Step S106). In other words, $Sc_k^T$, $Sc^R$, and $Y_i^{TMP}$ serving as fitting parameters are determined so that the error between $Y_i^{calc}$ expressed in the equation (6) and the observed pattern $Y_i^{obs}$ is minimized. In Step S106, $Y_i^{calc}$ expressed in the equation (6) is acquired, and the values obtained in Step S102, Step S104, and Step S105 are substituted thereinto.

Next, the correction pattern $Sc_i$ (before normalization) is calculated based on the equation (8) (Step S107), and is normalized based on the equation (9) (Step S108).

The processing of Step S105 to Step S108 described above is repeated until the error between $Y_i^{calc}$ and the observed pattern $Y_i^{obs}$ satisfies a convergence condition (Step S109).

Thereafter, the analysis device 14 reads the chemical composition information of the target components from the storage unit 16, and calculates $a_k$ based on the equation (2) (Step S110). Further, the analysis device 14 calculates $a_{R\_av}$ for the residual group (Step S111). For example, in the case where it is known at what mixture ratios components of what chemical compositions exist in the residual group, $a_{R\_av}$ is calculated based on the equation (14).

Thereafter, the weight fraction $w_k$ of the target components is calculated based on the equation (3) (Step S112). Further, the weight fraction $w_R$ of the residual group is calculated based on the equation (5) (Step S113). Then, the weight fractions $w_k$ and $w_R$ are displayed on the display unit 18 (Step S114).

Figure 4:
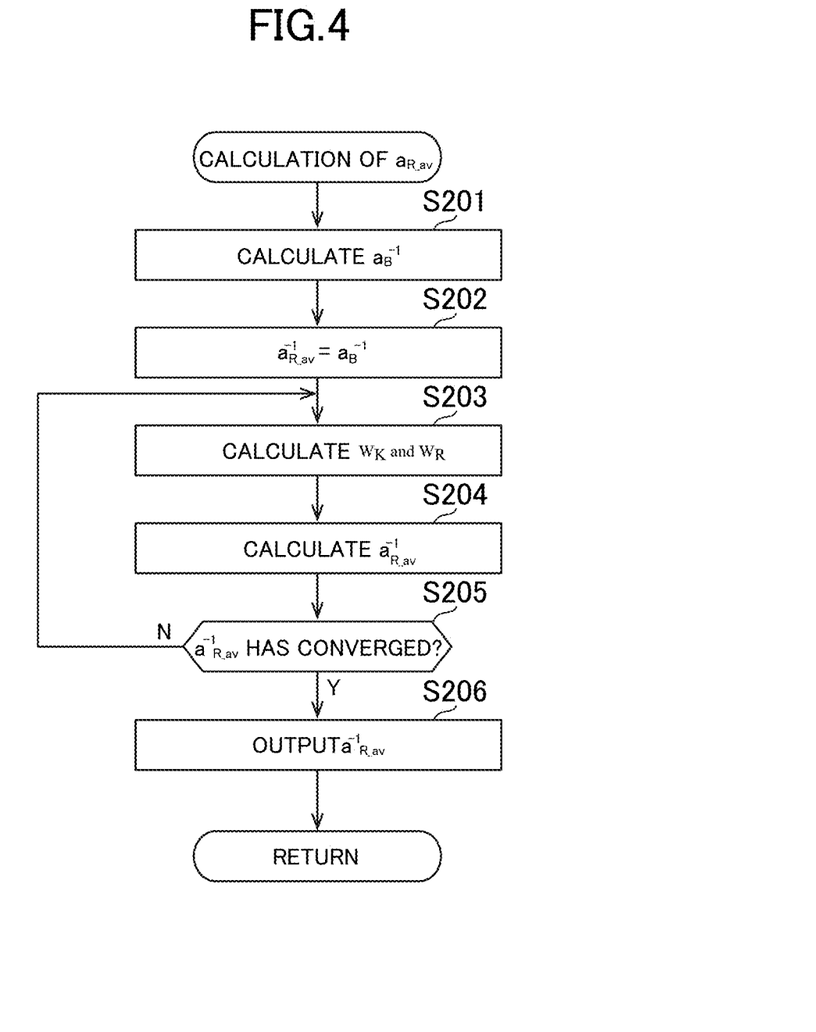
FIG. 4 is a flow chart illustrating a procedure of calculating a variable $a_{R\_av}$.

FIG. 4 is a flow chart illustrating a procedure of calculating a variable $a_{R\_av}$. The processing illustrated in FIG. 4 is an example of the processing of Step S111 illustrated in FIG. 3. The analysis device 14 reads the chemical composition information of the batch composition from the storage unit 16, and calculates $a_B^{-1}$ for the batch composition based on the equation (15) (Step S201). Next, $a_B^{-1}$ is set as an initial value of $a_{R\_av}^{-1}$ (Step S202), and the weight fractions $w_k$ and $w_R$ are calculated based on the equation (3) and the equation (5) (Step S203). Those values are substituted into the equation (16) to calculate $a_{R\_av}^{-1}$ (Step S204). The processing of Step S203 and Step S204 is repeated until $a_{R\_av}^{-1}$ satisfies a convergence condition, and when the convergence condition is satisfied, $a_{R\_av}^{-1}$ is output (Step S206). This value may be used in the processing of Step S112.

Figure 5:
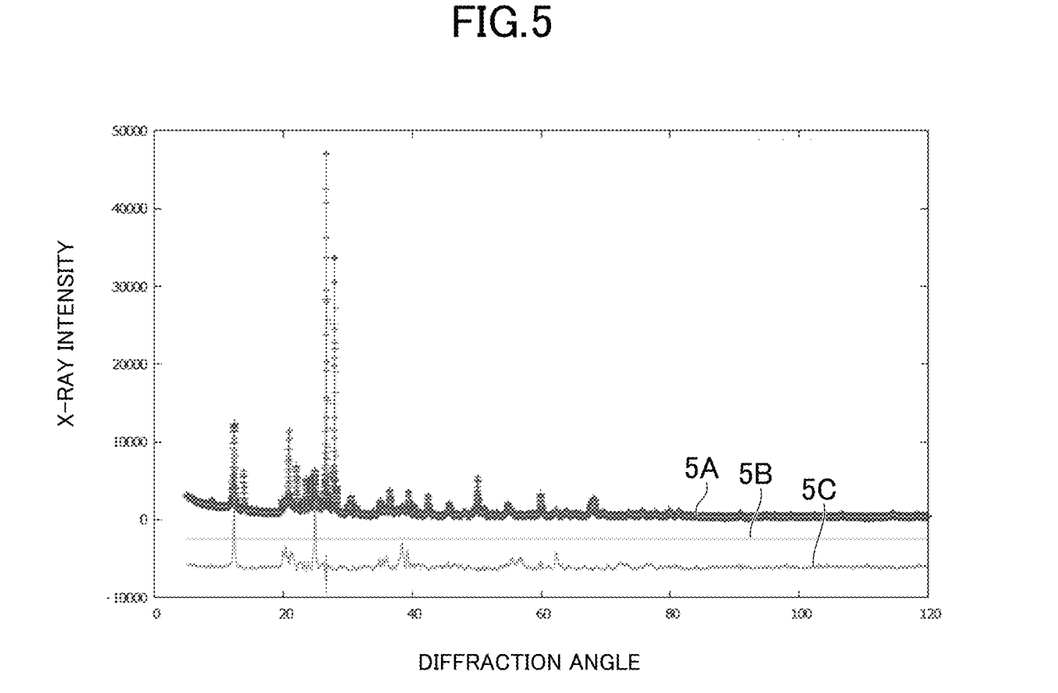
FIG. 5 is a graph showing an example of analysis by the analysis system in the at least one embodiment of the present invention.
Figure 6:
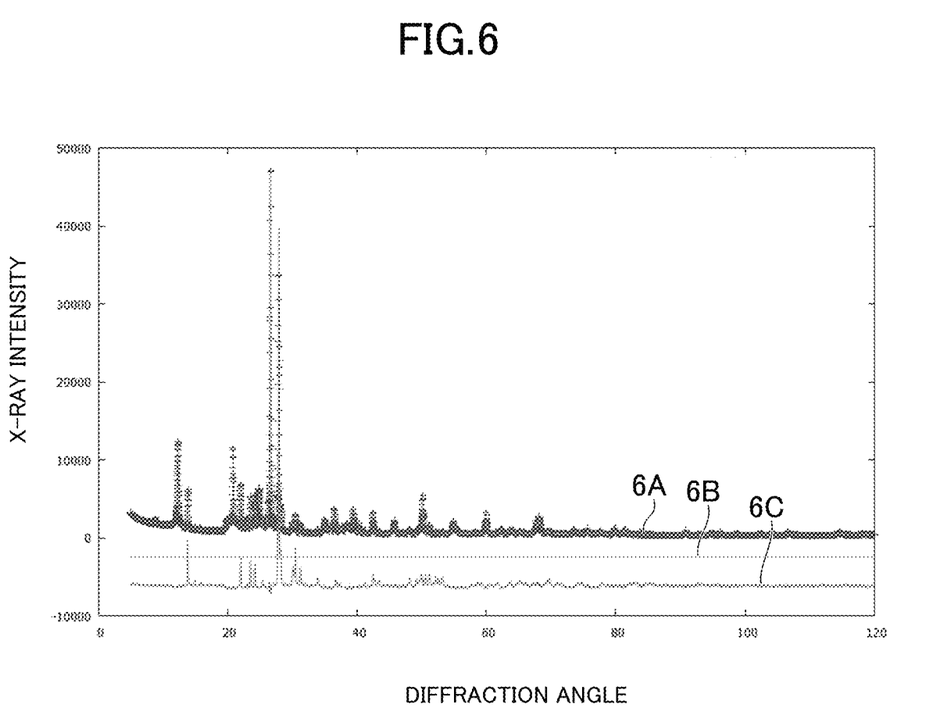
FIG. 6 is a graph showing an example of analysis by the analysis system in the at least one embodiment of the present invention.

FIG. 5 and FIG. 6 are graphs showing examples of analysis of X-ray diffraction patterns of a mixture sample by the analysis system 10 in the at least one embodiment of the present invention. The sample is a mixture containing u-quartz, albite, and kaolinite at mixture ratios of 1:1:1. A target component is a-quartz. A residual group is a mixture of albite and kaolinite. A diffraction pattern of the residual group per se is unknown.

In FIG. 5, a weight fraction of the target pattern is calculated using a known diffraction pattern of albite alone as $Y_i^R$ of the equation (6). In FIG. 5, the reference symbol 5A denotes the observed pattern $Y_i^{obs}$ and the fitting pattern $Y_i^{calc}$ in a superimposed manner. The reference symbol 5B denotes an error between the observed pattern $Y_i^{obs}$ and the fitting pattern $Y_i^{calc}$. The observed pattern $Y_i^{obs}$ and the fitting pattern $Y_i^{calc}$ completely fit to each other, and hence the error traces a straight line. The reference symbol 5C denotes the correction pattern $S_{ci}$ for the error. The pattern denoted by the reference symbol 5C closely matches a known diffraction pattern of kaolinite alone (not shown). When a weight fraction of c-quartz was calculated under the above-mentioned conditions, a relative error with respect to a true value was about 0.17%.

Meanwhile, in FIG. 6, a weight fraction of the target pattern is calculated using a known diffraction pattern of glass-$SiO_2$ alone as $Y_i^R$ of the equation (6). In FIG. 6, the reference symbol 6A denotes the observed pattern $Y_i^{obs}$ and the fitting pattern $Y_i^{calc}$ in a superimposed manner. The reference symbol 6B denotes an error between the observed pattern $Y_i^{obs}$ and the fitting pattern $Y_i^{calcc}$. The observed pattern $Y_i^{obs}$ and the fitting pattern $Y_i^{Calc}$ completely fit to each other, and hence the error also traces a straight line in this case. The reference symbol 6C denotes the correction pattern $S_{ci}$. The pattern denoted by the reference symbol 6C also resembles a pattern obtained by synthesizing the known diffraction pattern of albite alone and the known diffraction pattern of kaolinite alone (not shown). When the weight fraction of c-quartz was calculated, the relative error with respect to the true value was similarly about 0.70%.

According to the at least one embodiment of the present invention described above, even in the case where diffraction patterns are known for only some components, intensity ratios can be calculated not only for the components for which the diffraction patterns are known, but also for the residual group for which diffraction patterns are unknown, and weight fractions of those components can be calculated accurately.

In the above description, the intensity ratios are calculated by the present method to perform quantitative phase analysis, but the intensity ratios may be used for other purposes than quantitative phase analysis. For example, in a case where the residual group contains only one component, the component forming the residual group can be identified based on the unknown pattern $Sc_i \times Y_i^R$ after the calculation has converged.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A method of analyzing a diffraction pattern of a mixture, the method comprising:
    obtaining an observed pattern by performing an X-ray diffraction measurement with an X-ray diffractometer;
    acquiring the observed pattern of the X-ray diffraction from the X-ray diffractometer;
    acquiring a known target pattern from the X-ray diffractometer;
    acquiring a fitting pattern by taking summation of a first term obtained by multiplying the known target pattern indicating a target component by a first intensity ratio, and a second term obtained by multiplying an unknown pattern indicating a residual group consisting of one or more residual components by a second intensity ratio, and an intensity of a temporary pattern, wherein the fitting pattern has the first intensity ratio, the second intensity ratio, and the unknown pattern as fitting parameters;
    fitting the fitting pattern to the observed pattern by changing the first intensity ratio and the second intensity ratio in a state where the unknown pattern is set to an initial pattern; and
    fitting, after the fitting the fitting pattern by changing the first intensity ratio and the second intensity ratio, the fitting pattern to the observed pattern by changing the unknown pattern while restricting the changes of the first intensity ratio and the second intensity ratio.

2. The method of analyzing a diffraction pattern of a mixture according to claim 1, further comprising repeating the fitting the fitting pattern by changing the first intensity ratio and the second intensity ratio and the fitting the fitting pattern by changing the unknown pattern a plurality of times.

3. The method of analyzing a diffraction pattern of a mixture according to claim 1,
    wherein the fitting pattern further includes a term of the temporary pattern serving as a fitting parameter,
    wherein the fitting the fitting pattern by changing the first intensity ratio and the second intensity ratio includes fitting the fitting pattern to the observed pattern by changing the temporary pattern as well as the first intensity ratio and the second intensity ratio, and
    wherein the fitting the fitting pattern by changing the unknown pattern includes changing the unknown pattern so that at least a part of the term of the temporary pattern is absorbed by the term related to the residual group.

4. The method of analyzing a diffraction pattern of a mixture according to claim 1, further comprising performing quantitative phase analysis of the target component based on the first intensity ratio and the second intensity ratio.

5. The method of analyzing a diffraction pattern of a mixture according to claim 2, further comprising performing quantitative phase analysis of the target component based on the first intensity ratio and the second intensity ratio.

6. The method of analyzing a diffraction pattern of a mixture according to claim 3, further comprising performing quantitative phase analysis of the target component based on the first intensity ratio and the second intensity ratio.

7. A device for analyzing a diffraction pattern of a mixture, the device comprising:
  an observed pattern storage configured to store data of an observed pattern of X-ray diffraction;
  an analysis device configured to obtain a known target pattern and configured to obtain a fitting pattern by taking summation of a first term obtained by multiplying a known target pattern indicating a target component by a first intensity ratio, a second term obtained by multiplying an unknown pattern indicating a residual group consisting of one or more residual components by a second intensity ratio, and an intensity of a temporary pattern, wherein the fitting pattern has the first intensity ratio, the second intensity ratio, and the unknown pattern as fitting parameters; and
  a fitting pattern storage configured to store data indicating the fitting pattern,
  wherein the analysis device is further configured to fit the fitting pattern is fitted to the observed pattern by changing the first intensity ratio and the second intensity ratio in a state where the unknown pattern is set to an initial pattern; and configured to fit the fitting pattern to the observed pattern by changing the unknown pattern while restricting the changes of the first intensity ratio and the second intensity ratio after the fitting by changing the first intensity ratio and the second intensity ratio.

8. A computer-readable information storage medium having stored thereon a program for causing a computer to function as:
  an observed pattern storage configured to store data of an observed pattern of X-ray diffraction;
  an analysis device configured to obtain a known target pattern and configured to obtain a fitting pattern by taking summation of a first term obtained by multiplying a known target pattern indicating a target component by a first intensity ratio, a second term obtained by multiplying an unknown pattern indicating a residual group consisting of one or more residual components by a second intensity ratio, and an intensity of a temporary pattern, wherein the fitting pattern has the first intensity ratio, the second intensity ratio, and the unknown pattern as fitting parameters; and
  a fitting pattern storage configured to store data indicating the fitting pattern,
  wherein the analysis device is further configured to fit the fitting pattern to the observed pattern by changing the first intensity ratio and the second intensity ratio in a state where the unknown pattern is set to an initial pattern; and configured to fit the fitting pattern to the observed pattern by changing the unknown pattern while restricting the changes of the first intensity ratio and the second intensity ratio after the fitting by changing the first intensity ratio and the second intensity ratio.

* * * * *